United States Patent
Kisa (10) Patent No.: US 12,472,330 B2
(45) Date of Patent: Nov. 18, 2025

(54) CATHETER

(71) Applicant: KANEKA CORPORATION, Osaka (JP)

(72) Inventor: Toshiya Kisa, Okaya (JP)

(73) Assignee: KANEKA CORPORATION, Osaka (JP)

( * ) Notice: Subject to any disclaimer, the term of this patent is extended or adjusted under 35 U.S.C. 154(b) by 556 days.

(21) Appl. No.: 18/014,302

(22) PCT Filed: Jun. 2, 2021

(86) PCT No.: PCT/JP2021/021005
§ 371 (c)(1),
(2) Date: Jan. 3, 2023

(87) PCT Pub. No.: WO2022/009566
PCT Pub. Date: Jan. 13, 2022

(65) Prior Publication Data
US 2023/0256203 A1 Aug. 17, 2023

(30) Foreign Application Priority Data
Jul. 8, 2020 (JP) .................................. 2020-117631

(51) Int. Cl.
*A61M 25/01* (2006.01)
(52) U.S. Cl.
CPC ... *A61M 25/0147* (2013.01); *A61M 2025/015* (2013.01)
(58) Field of Classification Search
CPC .......... A61M 25/0141; A61M 25/0144; A61M 25/0147; A61M 2025/015; A61B 18/1492
See application file for complete search history.

(56) References Cited

U.S. PATENT DOCUMENTS 5,984,907 A * 11/1999 McGee ............. A61M 25/0144
604/95.01
2010/0217184 A1 8/2010 Koblish et al.
(Continued)

FOREIGN PATENT DOCUMENTS

JP 2006-61350 A 3/2006
JP 2008-245766 A 10/2008
(Continued)

OTHER PUBLICATIONS

International Search Report for PCT/JP2021/021005 mailed on Jul. 27, 2021.

*Primary Examiner* — Laura A Bouchelle
(74) *Attorney, Agent, or Firm* — Birch, Stewart, Kolasch & Birch, LLP (57) ABSTRACT

The objective is to provide a catheter that can realize a desired curve shape by preventing the curving axis of the catheter distal part from twisting, and preventing the catheter from kinking and decreased pushability. Disclosed is a catheter (1) having a shaft (2); at least one wire (30); a coil (60); a leaf spring (40) having a first connection part (41) where its proximal part is fixed to a distal end part of the coil (60); and a cover tube (50), wherein the coil (60) has a fixed part (61) where it is fixed to the shaft (2) at a position proximal to the proximal end of the cover tube (50); and the length from the distal end of the fixed part (61) to the proximal end of the cover tube (60) in the longitudinal direction is a length of 20 windings of the coil (60) or shorter.

7 Claims, 6 Drawing Sheets

(56) References Cited

U.S. PATENT DOCUMENTS

2014/0249510 A1    9/2014   Koblish et al.
2021/0038859 A1    2/2021   Kamiyama et al.

FOREIGN PATENT DOCUMENTS

| | | |
|---|---|---|
| JP | 2012-518477 A | 8/2012 |
| JP | 2012-200445 A | 10/2012 |
| JP | 2014-64614 A | 4/2014 |
| WO | WO 2019/156059 A1 | 8/2019 |

\* cited by examiner

CATHETER

TECHNICAL FIELD

The present invention relates to a catheter with a bendable distal part.

BACKGROUND ART

Electrode catheters with multiple electrodes on the distal part are used to measure or pace potentials in the heart. Some such catheters with electrodes have a distal part that is bendable by operating a handle so that the distal part of the catheter can be easily placed at a desired site in the heart. Such catheters generally allow the distal part of the catheter to be curved by pulling a pull wire fixed to the inside of the distal end part of the catheter.

In order to deliver the distal part of the catheter to the optimal site according to the size of the heart and purposes, it is required for the distal part of the catheter to be curved freely in the desired direction by wire manipulation. In addition, in order to prevent the distal part of the catheter from damaging the lumen wall of the living body or traveling in an undesired direction, it is necessary to prevent or reduce twisting or bending (kinking) of the distal part of the catheter when it is curved. For this reason, various forms of fixing the proximal side of the leaf spring for curving have been proposed.

As such catheters, a catheter is disclosed in which the distal ends of an operating wire and a leaf spring, which is a curving member, are fixed to the distal end of a catheter tube, and the proximal end of the curving member is connected to a tube disposed in the lumen of the catheter tube.

The catheters disclosed in Patent documents 1 and 2 have a configuration in which operating wires are disposed in tubes for the operating wires, a leaf spring is disposed in a catheter tube, and the proximal end of the leaf spring is fixed to a coil tube. In Patent document 2, the tubes for operating wires are fixed to the surface of the leaf spring and the like via an adhesive layer. In the catheter disclosed in Patent document 3, a leaf spring is fixed to a coil tube via a coil stopper. In the catheter disclosed in Patent document 4, an operating wire and a leaf spring are disposed in a distal tube, and the proximal end of the leaf spring is fixed to a proximal tube. In addition, a protection tube is disposed outside the proximal tube. It is disclosed that the proximal end of the distal tube is located distal to the distal end part of the protection tube.

RELATED ART DOCUMENT

Patent Document

Patent document 1: JP 2006-61350 A
Patent document 2: JP 2012-200445 A
Patent document 3: JP 2014-64614 A
Patent document 4: WO2019/156059

SUMMARY OF THE INVENTION

Problems to be Solved by the Invention

However, in conventional catheters, when a coil is provided that is connected to the proximal end part of the leaf spring, the coil is compressed by pulling of the wire, and the coil is deformed to spread in the radial direction, causing the connection between the coil and the leaf spring to rotate, which sometimes causes the curving axis of the leaf spring to twist. In order to prevent this, the connection part can be fixed to the catheter tube. However, the fixed part becomes hard, resulting in a stiffness step with a sudden change in hardness. This may cause a kink where the catheter breaks when the catheter is bent, or a decrease in pushability where the force of wire manipulation is difficult to be transmitted to the tip of the wire. In addition, when a conductive wire is placed in the fixed part, the conductive wire is also fixed, and the conductive wire may hinder the catheter from bending, adversely affecting the shape of the bend.

The present invention has been made in view of the above circumstances, and its objective is to provide a catheter that can realize a desired curved shape by preventing the curving axis of the distal end part of the catheter from twisting, while preventing the catheter from kinking and decreased pushability.

Means for Solving the Problems

A catheter that can solve the above problems has a shaft having a distal end, a proximal end, and a lumen extending in a longitudinal direction; at least one wire having a distal end and a proximal end, the proximal end being disposed at a proximal end part of the shaft, and a distal end part of the wire being fixed to a distal end part of the shaft; a coil having a distal end, a proximal end, and a lumen in which the wire is disposed and extending in the longitudinal direction in the lumen of the shaft; a leaf spring having a distal end and a proximal end and extending in the longitudinal direction in the lumen of the shaft; and a cover tube having a distal end, a proximal end, and a lumen extending in the longitudinal direction in the lumen of the shaft, wherein the leaf spring has a first connection part where a proximal end part of the leaf spring is fixed to a distal end part of the coil, and a second connection part where a distal end part of the leaf spring is fixed to a distal end part of the shaft; the wire, the leaf spring, and a distal part of the coil including the first connection part are disposed in the lumen of the cover tube; the proximal end of the cover tube is positioned distal to the proximal end of the coil; the coil has a fixed part where the coil is fixed to the shaft at a position proximal to the proximal end of the cover tube; and a length from a distal end of the fixed part to the proximal end of the cover tube in the longitudinal direction is a length of 20 windings of the coil or shorter.

Preferably, a part of an inner surface of the cover tube is in contact with the outside of the coil.

Preferably, a length from a distal end of the fixed part to the distal end of the coil is ⅓ a length of the leaf spring or longer in the longitudinal direction.

Preferably, a length from a distal end of the fixed part to the distal end of the coil is 2 times a length of the leaf spring or shorter in the longitudinal direction.

Preferably, the cover tube is not fixed to the shaft.

Preferably, a longitudinal length of the cover tube is longer than a longitudinal length of the leaf spring.

Preferably, the cover tube extends to the second connection part, and the cover tube covers the wire and the leaf spring so that the wire and the leaf spring are not exposed in the lumen of the shaft.

Effects of the Invention

The present invention can prevent the curving axis of a bendable distal end part of a catheter from twisting while preventing kinking and decrease in pushability. This allows a desired curved shape of the distal end part of the catheter to be achieved by wire manipulation, resulting in providing a catheter that can easily deliver the distal end part of the catheter to a desired location.

MODE FOR CARRYING OUT THE INVENTION

Hereinafter, the present invention will be described based on the following embodiments, and the present invention, however, is not limited by the following embodiments and can be altered in design within a scope in compliance with the intent described above and below, and all the changes are to be encompassed within a technical scope of the present invention. Note that, in each drawing, hatching, reference signs for components, and the like may be omitted for convenience of description, and in such a case, the specification and other drawings are to be referred to. Furthermore, since the dimensions of the various components in the drawings are provided for the purpose of facilitating the understanding of the feature of the present invention, the dimensions may differ from the actual dimensions in some cases.

The catheter of the present invention has a shaft having a distal end, a proximal end, and a lumen extending in a longitudinal direction; at least one wire having a distal end and a proximal end, the proximal end being disposed at a proximal end part of the shaft, and a distal end part of the wire being fixed to a distal end part of the shaft; a coil having a distal end, a proximal end, and a lumen in which the wire is disposed and extending in the longitudinal direction in the lumen of the shaft; a leaf spring having a distal end and a proximal end and extending in the longitudinal direction in the lumen of the shaft; and a cover tube having a distal end, a proximal end, and a lumen extending in the longitudinal direction in the lumen of the shaft, wherein the leaf spring has a first connection part where a proximal end part of the leaf spring is fixed to a distal end part of the coil, and a second connection part where a distal end part of the leaf spring is fixed to a distal end part of the shaft; the wire, the leaf spring, and a distal part of the coil including the first connection part are disposed in the lumen of the cover tube; the proximal end of the cover tube is positioned distal to the proximal end of the coil; the coil has a fixed part where the coil is fixed to the shaft at a position proximal to the proximal end of the cover tube; and a length from a distal end of the fixed part to the proximal end of the cover tube in the longitudinal direction is a length of 20 windings of the coil or shorter.

With the above configuration, the catheter of the present invention can bend the catheter distal part in the section distal to the distal end of the coil by bending the leaf spring connected to the distal end part of the shaft with pulling the wire while ensuring the stiffness of the base end of the shaft end part by the coil. The catheter of the present invention with the above configuration can prevent the curving axis of the catheter end part from twisting because even if the coil in which the wire is placed in the lumen is compressed by pulling the wire, the outer diameter of the coil is unlikely to deform, such as spreading. In addition, because the distal end of the coil and the fixed part are not close to each other, a stiffness step with a sudden change in hardness at the distal end of the coil can be mitigated, and kinking of the catheter and decrease in pushability can be prevented. Furthermore, because the length from the distal end of the fixed part to the proximal end of the cover tube is shorter than a predetermined value with respect to the coil, it can be made unlikely for the coil in the section from the distal end of the fixed part to the proximal end of the cover tube to be twisted or otherwise deformed. Accordingly, the catheter of the present invention can easily deliver the catheter distal part to a desired location in a blood vessel or the heart, and also prevent the catheter distal part from damaging the lumen wall of the living body or traveling in an undesired direction.

Note that the fixation of the coil, cover tube, and shaft in the present invention means that they are fixed by some fixing means, such as adhesion by glue, welding by resin, brazing by solder, etc., and merely contacting or overlapping firmly are not included in the fixation. For example, the cover tube may be provided by heat-shrinking resin on the outside of the coil, in which case the cover tube may adhere to the outside of the coil. However, such a condition is not considered as the cover tube and the coil being fixed. Furthermore, if the shaft is provided on the outer side by heat-shrinking, etc., the coil, the cover tube, and the shaft may adhere to each other, and the coil and the shaft may indirectly adhere. However, such a condition is not considered as the coil and the shaft being fixed. Moreover, at the section where the cover tube is not placed in the longitudinal direction, the shaft may be provided in close contact with the outside of the coil. However, such a condition is not considered as the coil and the shaft being fixed.

Figure 1:
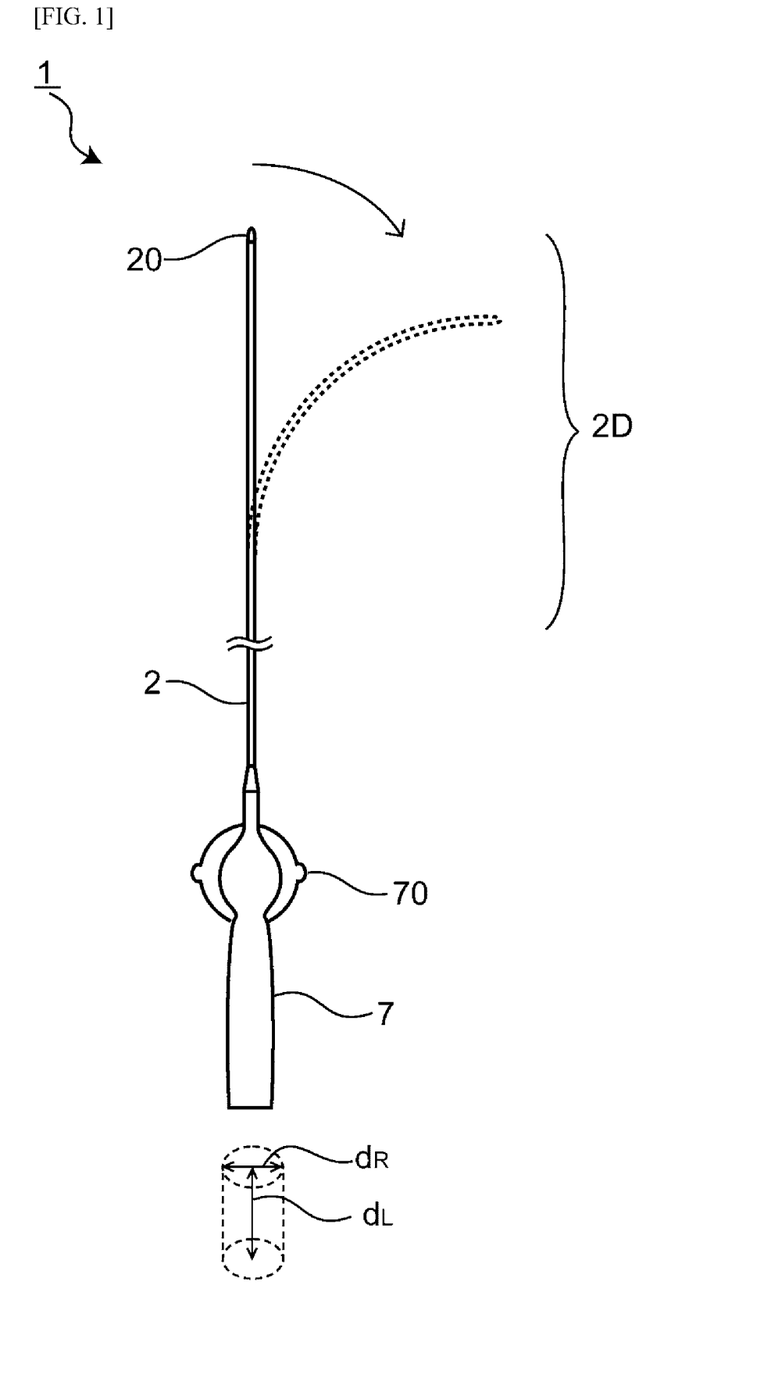
FIG. 1 is a plan view of a catheter according to one embodiment of the present invention.
Figure 2:
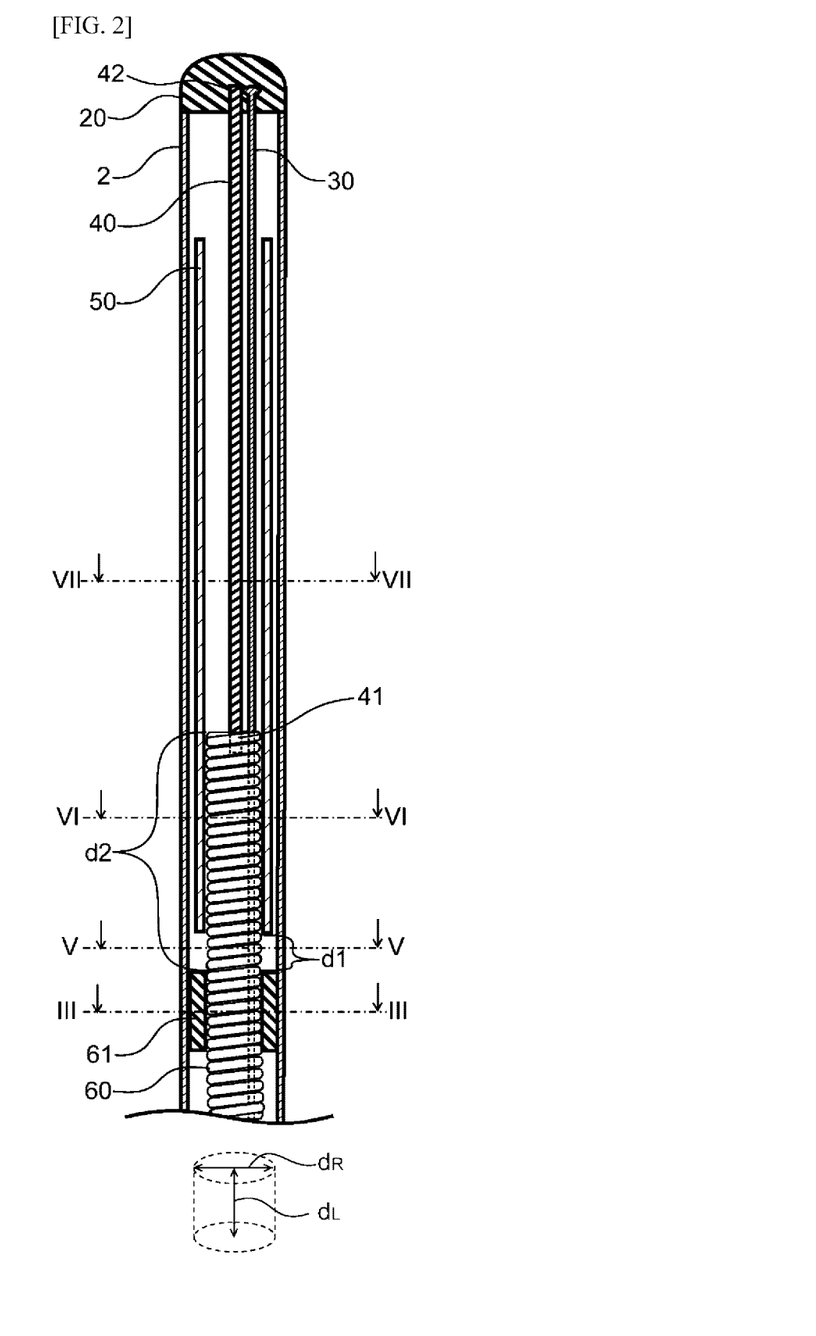
FIG. 2 is a cross-sectional view of a distal part of the catheter shown in FIG. 1 in the longitudinal direction (partially, a plan view).
Figure 3:
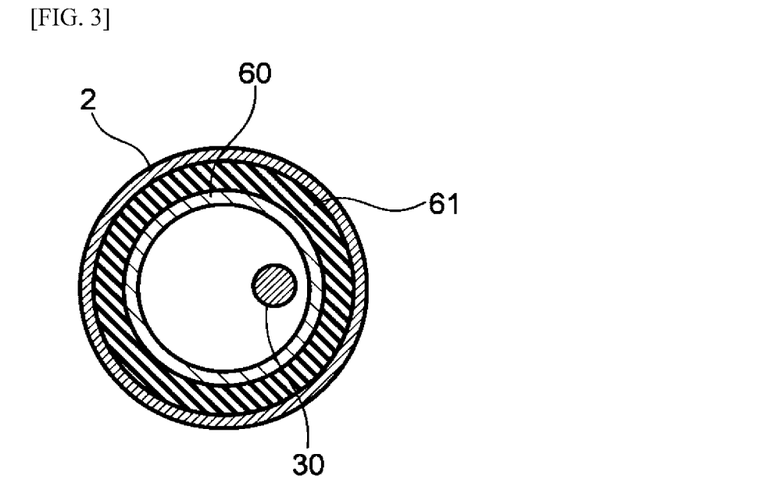
FIG. 3 is a III-III cross-sectional view of the catheter distal part shown in FIG. 2
Figure 4:
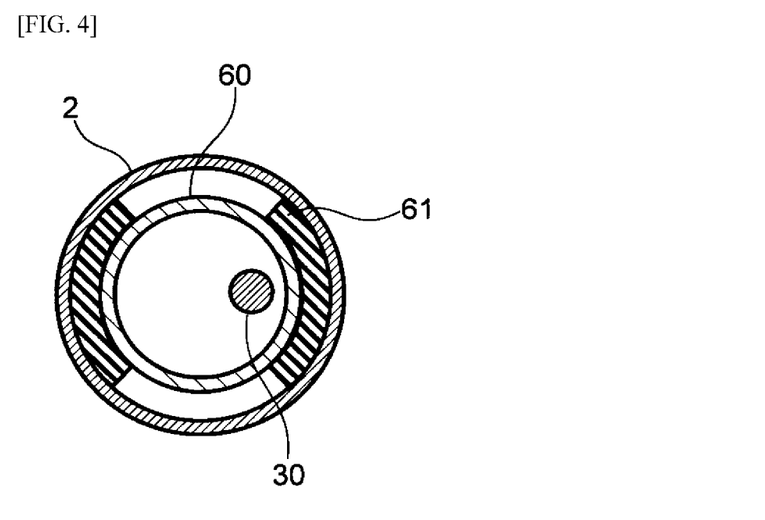
FIG. 4 is another example of the III-III cross-sectional view of the catheter distal prat shown in FIG. 2
Figure 5:
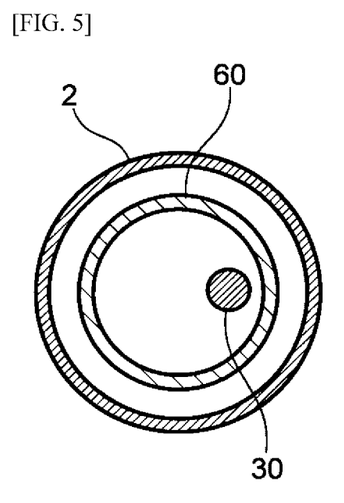
FIG. 5 is a V-V cross-sectional view of the catheter distal part shown in FIG. 2
Figure 6:
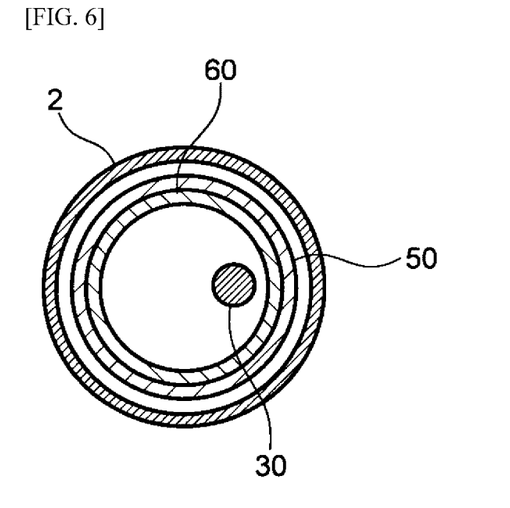
FIG. 6 is a VI-VI cross-sectional view of the catheter distal part shown in FIG. 2.
Figure 7:
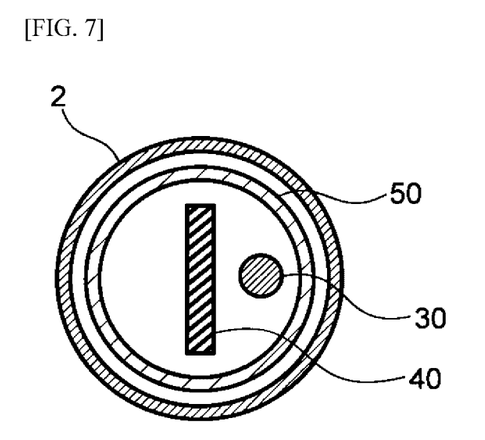
FIG. 7 is a VII-VII cross-sectional view of the catheter distal part shown in FIG. 2.
Figure 8:
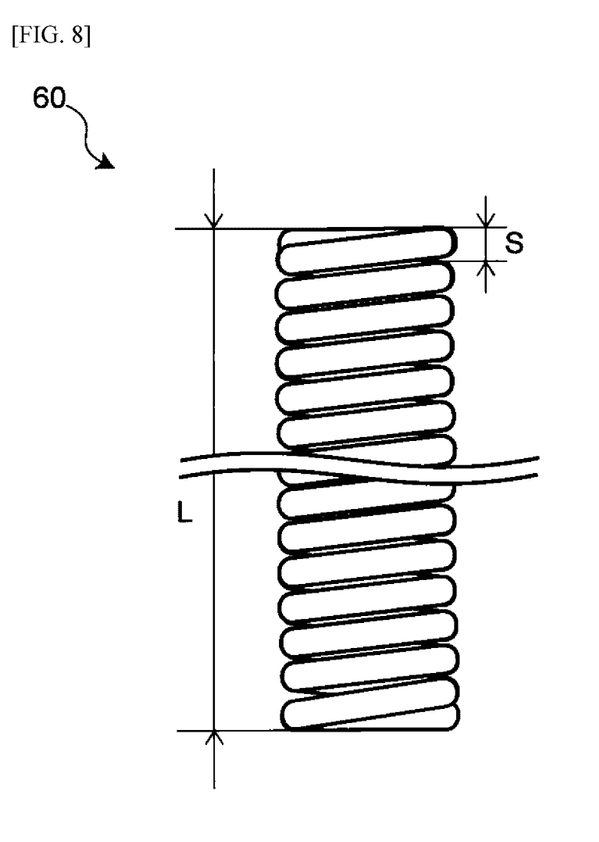
FIG. 8 is a plan view of a coil according to one embodiment of the present invention.
Figure 9:
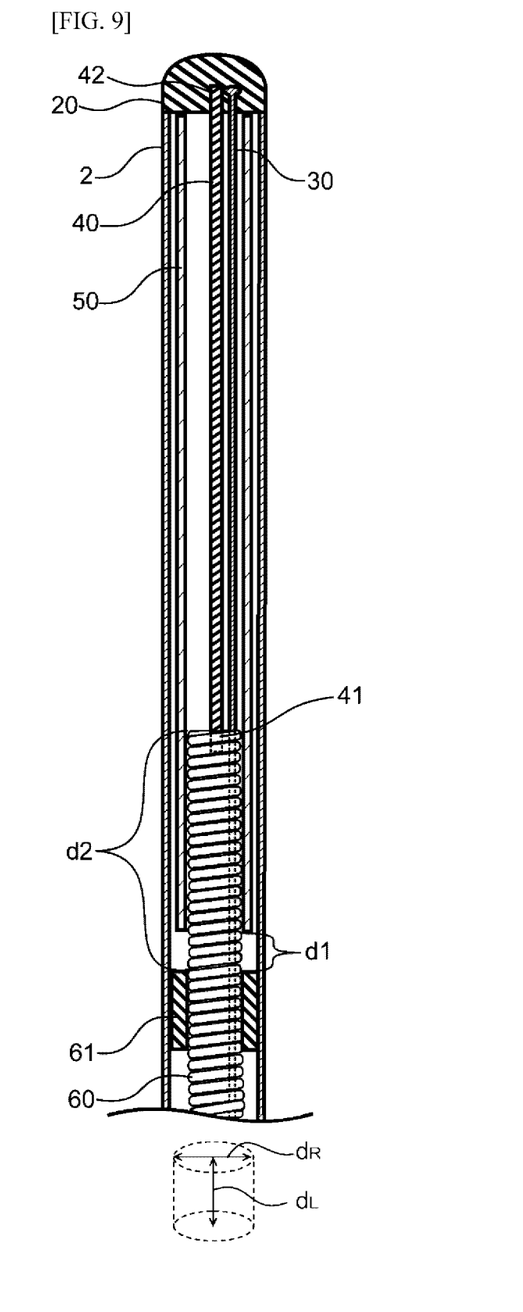
FIG. 9 is a cross-sectional view of a distal part of a catheter according to another embodiment of the present invention in the longitudinal direction (partially, a plan view).

Hereinafter, a catheter according to embodiments of the present invention will be described referring to FIG. 1 to FIG. 9. FIG. 1 is a plan view of a catheter according to one embodiment of the present invention, and the dotted lines represent the appearance when the catheter distal part is curved on one side of the leaf spring in the radial direction of the shaft. FIG. 2 is a cross-sectional view of the distal part in the longitudinal direction when the catheter shown in FIG. 1 is not curved. In FIG. 2, the coil is shown as a plan view. FIG. 3 is a III-III cross-sectional view of the catheter distal part shown in FIG. 2, and FIG. 4 is another example of the III-III cross-sectional view of the catheter distal part shown in FIG. 2. FIG. 5, FIG. 6, and FIG. 7 are a V-V cross-sectional view, VI-VI cross-sectional view, and VII-VII cross-sectional view of the catheter distal part shown in FIG. 2, respectively. FIG. 8 is a plan view of a coil according to one embodiment of the present invention in its natural state. FIG. 9 is a cross-sectional view of a distal part of a catheter according to another embodiment of the present invention when the catheter is not curved. In FIG. 9, the coil is shown as a plan view.

In the present invention, a proximal side refers to the user's hand in the direction of shaft extension, and a distal side refers to the opposite side of the proximal side, i.e., the side of the person to be treated. The direction of shaft extension is referred to as a longitudinal direction $d_L$. The radial direction perpendicular to the direction of shaft extension is referred to as a radial direction $d_R$. In FIGS. 1, 2, and 9, the lower side of the figure is the proximal side and the upper side of the figure is the distal side.

As shown in FIG. 1, a catheter 1 has a distal end, a proximal end, and a shaft 2 having a lumen extending in the longitudinal direction $d_L$. A tip part 20 is preferably disposed at the distal end of the shaft 2, and a handle 7 is preferably disposed at a proximal end part of the shaft 2.

The distal end of the shaft 2 is inserted into the body, and delivered to a treatment site. For this reason, preferably, it is flexible, and metals or resins can be used as the material. Since it is inserted into the body, it is preferably to use biocompatible materials. On the surface of the shaft 2, devices for treatment, such as electrodes and sensors, can be placed. By providing electrodes on the shaft 2, it can be used as an electrode catheter to measure cardiac potential or an ablation catheter to cauterize tissue.

Internal structures for curving the catheter 1, or devices and their internal structures for treatment, such as sensors and conductive wires, for example, may be placed in the lumen of the shaft 2. The distal side of the conductive wire can be connected to an electrode provided on the surface of the shaft 2, and the proximal side of the conductive wire can be connected to a detector or power source through the proximal side of the catheter 1 so that electric signals from the electrode can be received or the electrode can be energized. The length in the longitudinal direction $d_L$, outer diameter, thickness etc. of the shaft 2 can be selected to be the appropriate size for the treatment.

The tip part 20 is preferably disposed at the distal end of the shaft 2. The tip part 20 may be a member different from or the same as the shaft 2. When the tip part 20 is a member different from the shaft 2, the tip part 20 may be provided with a part that is inserted into the lumen of the shaft 2 or a part that projects distally from the distal end of the shaft 2. When the tip part 20 is a member integrated with the shaft 2, the distal end part of the shaft 2 may be formed by sealing the opening at the distal end of the shaft 2 by heat fusion or other means to form the tip part 20.

The handle 7 is preferably disposed at the proximal side of the shaft 2, and the proximal end of the shaft 2 is preferably fixed to the inside of the handle 7. A conductive wire or a wire 30 described below extending from the lumen of the shaft 2 is disposed within the handle 7. To facilitate manipulation of the wire 30, the handle 7 may include a wire manipulator 70. By fixing the proximal end of the wire 30 to the wire manipulator 70, the wire 30 can be pulled by operating the wire manipulator 70 to bend the catheter distal part 2D of the catheter 1.

As shown in FIG. 2 to FIG. 7, the catheter 1 has at least one wire 30 having a distal end and a proximal end, the proximal end being disposed at a proximal end part of the shaft 2, and a distal end part of the wire 30 being fixed to a distal end part of the shaft 2; and a leaf spring 40 extending in the longitudinal direction $d_L$ in the lumen of the shaft 2 and having a distal end and a proximal end, a distal end part of the leaf spring 40 being fixed to the distal end part of the shaft 2 at a second connection part 42. By pulling the wire 30, the shaft 2 can be curved. The leaf spring 40 can control the direction of the bending.

The wire 30 is an operating wire for manipulating the catheter distal part 2D of the catheter 1 to bend. At least one wire 30 is provided, and for example, two of the wire 30 may be provided to make the catheter 1 capable of curving to both one side and the other side of the leaf spring 40 in the radial direction $d_R$, respectively, by operating each wire 30. The wire 30 is disposed in the lumen of the shaft 2, and its distal end is fixed to the distal end part of the shaft 2, preferably the tip part 20, and its proximal end is disposed at the proximal end part of the handle 7. The proximal end part of the wire 30 is preferably fixed to the handle 7. As the wire 30, metal wires such as stainless steel or wires formed from synthetic resins such as fluoroplastics can be used. The wire 30 may be a single wire or may have a structure consisting of multiple wires.

The leaf spring 40 is a member that defines the direction of curvature of the catheter 1, and has a plate-like shape having a distal end and proximal end and extending in the longitudinal direction $d_L$ of the shaft 2. The leaf spring 40 is preferably placed along the longitudinal axis of the shaft 2. Since the leaf spring 40 has a plate-like shape, the direction of curvature of the catheter distal part 2D of the catheter 1 can be defined, and the catheter distal part 2D can be curved on one side or the other side in the radial direction $d_R$. The distal end part of the leaf spring 40 is fixed to the distal end part of the shaft 2. In the case where the tip part 20 is provided at the distal end of the shaft 2, the distal end part of the leaf spring 40 is preferably fixed to the tip part 20. The proximal end part of the leaf spring 40 is fixed to a distal end part of the coil 60 at a first connection part 41. In other words, the leaf spring 40 has the first connection part 41 where the proximal end part of the leaf spring 40 is fixed to the distal end part of the coil 60 and the second connection part 42 where the distal end part of the leaf spring 40 is fixed to the distal end part of the shaft 2.

The leaf spring 40 is a spring using a plate material, and the materials that make up the leaf spring 40 includes metals such as stainless steel, titanium, carbon steel, nickel-titanium alloys, cobalt-chrome alloys, tungsten alloys. Alternatively, the materials that make up the leaf spring 40 may include synthetic resin such as aromatic polyetherketone resin (e.g., PEEK), polycarbonate resin, and fiber-reinforced resin. Alternatively, the leaf spring 40 may be made of natural rubber or synthetic rubber such as butadiene rubber, isoprene rubber, styrene butadiene rubber, ethylene propylene rubber, acrylic rubber, and silicone rubber. Of these, the material of the leaf spring 40 is preferably stainless steel.

The fixation of the distal end part of the wire 30 and the distal end part of the leaf spring 40 to the shaft 2, or the first connection part 41 of the proximal end part of the leaf spring 40 and the coil 60 may be fixed by not fixing the ends directly, but by fixing the vicinity of the ends. The method of fixing the distal end part or proximal end part of the wire 30 and the leaf spring 40 is not limited, and may include, for example, solder, and when the tip part 20 and the coil 60 are metal, they are preferably fixed by laser welding.

As shown in FIG. 2 to FIG. 7, a cover tube 50 and the coil 60 are placed in the lumen of the catheter 1 from the distal side. The cover tube 50 has a lumen extending in the longitudinal direction $d_L$ in which the wire 30 and the leaf spring 40 are placed. The coil 60 has a lumen extending in the longitudinal direction $d_L$ and its distal end part is fixed to the proximal end part of the leaf spring 40.

The cover tube 50 has a distal end, proximal end, and lumen extending in the longitudinal direction $d_L$ in the lumen of the shaft 2. As shown in FIG. 2, the wire 30 and the leaf spring 40 are disposed in the lumen of the cover tube 50. At the proximal side of the cover tube 50, the distal part of the coil 60 is placed in the lumen of the cover tube 50. The distal part of the coil 60 placed in the lumen of the cover tube 50 includes the first connection part 41 of the coil 60 and the leaf spring 40. Placing at least distal part of the coil 60 including the first connection part 41 in the lumen of the cover tube 50 can prevent the distal part of the coil 60 including the first connection part 41, which is the base of the bend when the catheter distal part 2D is curved by pulling the wire 30, from deforming, such as spreading in the radial direction $d_R$, which prevents the curving axis of the leaf spring 40 from twisting due to rotation of the first connection part 41 of the coil 60 and the leaf spring 40. As a result, the catheter distal part 2D can be curved to a certain direction without twisting. The distal end of the cover tube 50 may be disposed at the distal end part of the shaft 2, or there may be a section where the wire 30 and the leaf spring 40 are exposed from the cover tube 50 at the distal end part of the shaft 2. The proximal end of the cover tube 50 is disposed distal to the proximal end of the coil 60. Thereby, the coil 60 and the shaft 2 can be fixed.

The cover tube 50 preferably has flexibility, like the shaft 2, and the materials that make up the cover tube 50 may include synthetic resin such as aromatic polyetherketone resin (e.g., PEEK), polycarbonate resin, polyamide-based resin, polyester-based resin, polyurethane-based resin, polyolefin-based resin, vinyl chloride-based resin, silicone-based resin, natural rubber, and synthetic rubber. The cover tube 50 is preferably formed by heat shrinking such synthetic resins to the outside of the coil 60.

The coil 60 has the distal end, proximal end, and lumen extending in the longitudinal direction $d_L$ in the lumen of the shaft 2. The coil 60 is disposed at the proximal side of the leaf spring 40 in the lumen of the shaft 2, and its distal end part is fixed to the proximal end part of the leaf spring 40. The wire 30 is disposed in the lumen of the coil 60. It is sufficient for the first connection part 41 of the coil 60 and the leaf spring 40 to fix the leaf spring 40 to the coil 60, and the proximal end of the leaf spring 40 may be placed in the lumen of the coil 60 or may be placed outside the lumen of the coil 60. Alternatively, the proximal end of the leaf spring 40 may be fixed to the distal end of the coil 60. At the first connection part 41 of the leaf spring 40, the coil 60 preferably receive the proximal end of the leaf spring 40 so that a part of the leaf spring 40 is placed in the lumen of the coil 60 to fix the proximal end part of the leaf spring 40. This allows for a stronger fixation between the leaf spring 40 and the coil 60.

Providing the coil 60 can ensure stiffness at the base side of the curvature of the catheter distal part 2D. From the viewpoint of securing stiffness of the base side of the curvature of the catheter distal part 2D, the coil 60 is preferably a closely wound coil, that is, an uncompressed coil. The coil 60 that is uncompressed can make the catheter distal part 2D to curve at the distal end of the coil 60 as a starting point. Technically, an uncompressed coil has the ratio of a total length $L_c$ at maximum compression to the total length L in its natural state $L_c/L$ is 1. However, a coil with the ratio $L_c/L$ of 0.9 or more, 0.95 or more is substantially uncompressed, and included in the uncompressed coil. The proximal end of the coil 60 may be positioned at the proximal end of the shaft 2, or may be positioned in the middle of the shaft 2. The coil 60 may switch to a different tube in the middle of the shaft 2.

The coil 60 preferably has flexibility, and metals and resins can be used as the material, and the coil 60 can be made of metal wire such as stainless steel and nickel-titanium alloys and synthetic resin wire such as aromatic polyetherketone resin (e.g., PEEK) and polycarbonate resin. The cross-sectional shape of the coil wire forming the coil 60 can be circular, quadrangular, or a combination thereof. Of these, the coil 60 is preferably a coil made of stainless steel wire having a circular cross-sectional shape. The coil wire diameter, coil diameter, and length of the coil 60 can be appropriately selected as necessary. In particular, the coil 60 is preferably a coil wound with metal wire. The diameter of coil wire forming the coil 60 is preferably 0.1 mm to 0.5 mm. When the coil 60 is formed with coil wire having a quadrangular cross-sectional shape, one side of the quadrangle may be 0.05 mm to 1 mm. Since the catheter 1 of the present invention has the internal structure that switches at the distal end of the coil 60, the size, flexibility, and materials of the coil 60 is preferably selected so that the change in stiffness of the catheter 1 between the distal and proximal side with respect to the distal end of the coil 60 does not become significant.

The coil 60 has a fixed part 61 where the coil 60 is fixed to the shaft 2 at a position proximal to the proximal end of the cover tube 50. By fixing the coil 60 to the shaft 2, deformation of the coil 60 can be prevented, which prevents the shaft 2 from twisting, and the catheter distal part 2D can be curved to a certain direction without being twisted. The fixed part 61 is formed by some fixing means, such as adhesion by glue and brazing by solder, etc.

As shown in FIG. 2, a length d1 from the distal end of the fixed part 61 to the proximal end of the cover tube 50 in the longitudinal direction $d_L$ of the shaft 2 is a length of 20 windings of the coil 60 or shorter in the natural state of the coil 60. The shorter the length d1 is, the better, although it depends on the length of the fixed part 61 in the longitudinal direction $d_L$ and the length of the portion where the coil 60 is disposed in the lumen of the cover tube 50. For example, it is preferred that the length of the portion where the coil 60 is disposed in the lumen of the cover tube 50, the length of the fixed part 61 in the longitudinal direction $d_L$, and the length d1 should be shorter in length in this order. This allows the fixed part 61 to be placed near the proximal end of the cover tube 50, thus preventing deformation or twisting of the coil 60. In addition, since the length of the portion of the coil 60 that is not placed in the lumen of the cover tube 50 at the position distal to the fixed portion 61 in the longitudinal direction $d_L$ can be made short, problems such as twisting of the coil 60 at the position distal to the fixed portion 61 or position proximal to the proximal end of the cover tube 50 can be prevented during curving operation, allowing the catheter distal part 2D to be curved to a certain direction. Furthermore, since the fixed part 61 is disposed at a side proximal to the proximal end of the cover tube 50, the fixed part 61 does not overlap the distal end of the coil 60 and the first connection part 41 where the coil 60 and the leaf spring 40 are fixed, which make it unlikely to generate stiffness step in which the stiffness of the shaft 2 significantly changes, and thus, kinking and reduction in pushability can be prevented when the catheter distal part 2D is curved.

As shown in FIG. 2 to FIG. 4, the fixed part 61 is provided between the outer circumference of the coil 60 and the inner circumference of the shaft 2, and has a length in the longitudinal direction $d_L$ of the coil 60 and the shaft 2. The fixed part 61 may be provided in all 360° of the circumference between the outer circumference of the coil 60 and the inner circumference of the shaft 2 as shown in FIG. 3, or may be provided partially as shown in FIG. 4. In the case where the fixed part 61 is partially provided in a portion of the 360° of the circumference as shown in FIG. 4, the total angle at which the fixed part 61 is present in the circumference is preferably 60° or more, and more preferably 90° or more. When the lower limit of the total angle at which the fixed part 61 is present in the circumference is the above, the fixing strength can be ensured. The total angle at which the fixed part 61 is present in the circumference may be 240° or less, or 180° or less. With the upper limit of the total angle at which the fixed part 61 is present in the circumference is the above, when the catheter 1 has a conductive wire connected to an electrode or other device located at the distal end part of the catheter distal part 2D, the space formed between the outer circumference of the coil 60 and the inner circumference of the shaft 2 can provide a path for the conductive wire to be inserted. In such a configuration, the conductive wire is not fixed, which can prevent the conductive wire from being pulled when the catheter distal part 2D is curved, enabling smooth bending operation.

The length of the fixed part 61 in the longitudinal direction d1, is not particularly limited, and preferably a length of 50 windings of the coil 60 or shorter, more preferably a length of 30 windings or shorter, and even more preferably a length of 10 windings or shorter. If the length of the fixed part 61 in the longitudinal direction d1, is long, the stiffness of a portion of the shaft 2 where the fixed part 61 is provided becomes high, and the difference in stiffness may cause problems such as kinking or reduction in pushability. The length of the fixed part 61 in the longitudinal direction dL shorter than or equal to the above can make it unlikely to generate the stiffness step of the shaft 2 due to the fixed part 61, allowing the catheter distal part 2D to be curved without problems kinking or reduction in pushability. In addition, when the catheter 1 has a conductive wire connected to an electrode or other device located at the distal end part of the catheter distal part 2D, since the conductive wire is disposed inside the shaft 2 and outside the coil 60, even if the fixed part 61 is provided at all circumrefence of the coil 60, the fixed part 61 having a short length in the longitudinal direction $d_L$ can minimize the fixation of the conductive wire, preventing the conductive wire from being tugged and allowing smooth curving operation.

Note that a length of one winding of the coil 60 is the length of the coil 60 in the axis direction that corresponds to the length of one winding of the coil wire forming the coil 60 in its natural state. When the coil 60 is an uncompressed coil and the ratio of the total length $L_c$ at maximum compression to the total length L in its natural state $L_c/L$ is 1, a length of one winding of the coil 60 is equal to the wire diameter of the coil wire forming the coil 60. The length of one winding of the coil 60 can be measured as one winding S shown in FIG. 8. A length of 20 windings of the coil 60 is 20 times the length of one winding S.

The catheter distal part 2D of the catheter 1 can be curved from a position where the leaf spring 40 is exposed from the distal end of the coil 60 to a position where the leaf spring 40 is fixed to the distal end part of the shaft 2, for example, the tip part 20. Accordingly, the length of the curving portion of the catheter 1 can be appropriately determined by the length of the leaf spring 40, the position of the tip part 20 and the first connection part 41.

Preferably, a part of the inner surface of the cover tube 50 is in contact with the outside of the coil 60. The cover tube 50 may be provided on the outside of the coil 60 by heat-shrinking or other means to firmly overlap the outside of the coil 60. The cover tube 50 being in contact with the outside of the coil 60 can prevent the coil 60 from deforming when the wire 30 is operated. It is not necessary for the cover tube 50 to be in contact with the outside of the coil 60 in all of the portion that encompasses the coil 60, and the portion from the distal end of the coil 60 to a slightly proximal position, for example, a portion having a length of 3 windings of the coil 60 or shorter may not be in contact with the cover tube 50. Thus, even if the cover tube 50 has a portion that is not in contact with the outside of the coil 60, the cover tube 50 is in contact with the coil in most of the areas that encompasses the coil 60 can prevent the coil 60 from deforming.

Preferably, a length d2 from the distal end of the fixed part 61 to the distal end of the coil 60 is ⅓ the length of the leaf spring 40 or longer in the longitudinal direction $d_L$ of the shaft 2. The catheter distal part 2D is stiffer in the section in the longitudinal direction $d_L$ where the coil 60 is present due to the stiffness of the coil 60 itself, and less stiff in the section where the coil 60 is not present. In addition, since the first connection part 41 where the leaf spring 40 is fixed to the distal end part of the coil 60 is also a part that has increased stiffness, some change in stiffness is inevitable at the distal end of the coil 60. At the same time, since the stiffness is also increased at the fixed part 61, the fixed part 61 is also a cause of stiffness steps. However, when the catheter 1 is configured so that the length from the distal end of the fixed part 61 to the distal end of the coil 60 is longer than or equal to the above predetermined value with respect to the length of the leaf spring 40, which is a curving member, since the stiffness change at the distal end of the coil 60 and the stiffness change due to the fixed part 61 do not overlap, the stiffness change can be distributed, resulting in the prevention of sudden stiffness step in the shaft 2, which can prevent or reduce kinking and reduction in pushability when the catheter distal part 2D is curved. The length d2 from the distal end of the fixed part 61 to the distal end of the coil 60 in the longitudinal direction $d_L$ of the shaft 2 may be ½ the length of the leaf spring 40 or longer, or may be ¾ or longer.

The length d2 from the distal end of the fixed part 61 to the distal end of the coil 60 in the longitudinal direction $d_L$ of the shaft 2 is preferably 2 times the length of the leaf spring 40 or shorter. If the length 2d from the distal end of the fixed part 61 to the distal end of the coil 60 is longer than the above range, the leaf spring 40 and the coil 60 become twisted due to friction and the like with the inner layer of the shaft 2 when the entire shaft 2 is twisted, and the coil 60 in such a condition may be fixed to the shaft 2. Then, even if the twisted shaft 2 is recovered to an untwisted state, the leaf spring 40 remains twisted, and the catheter distal part 2D may not be able to bend in a certain direction and instead may curve spirally, resulting in that the catheter distal part 2D cannot be delivered to the desired position. When the length d2 from the distal end of the fixed part 61 to the distal end of the coil 60 is 2 times or shorter the length of the leaf spring 40, which is a curving member, as described above, the coil 60 can be fixed to the shaft 2 in the condition where the leaf spring 40 and the coil 60 are not twisted, allowing the catheter distal part 2D to be curved to a certain direction without twisting. The length d2 from the distal end of the fixed part 61 to the distal end of the coil 60 in the longitudinal direction $d_L$ is preferably 1.5 times the length of the leaf spring 40 or shorter, and even more preferably 1 time or shorter.

Preferably, the cover tube 50 is not fixed to the shaft 2. When the cover tube 50 having the lumen in which the distal part of the coil 60 including the first connection part 41 of the leaf spring 40 and the coil 60 is placed is not fixed to the shaft 2, the stiffness change at the distal end part of the coil 60 and the stiffness change due to fixation of the cover tube 50 and the shaft 2 do not overlap, making sudden change in stiffness unlikely to occur, and therefore, stiffness steps of the catheter distal part 2D can be prevented, making it less prone to kinking and reduction in pushability.

Preferably, the length of the cover tube 50 in the longitudinal direction $d_L$ is longer than the length of the leaf spring 40 in the longitudinal direction $d_L$. The cover tube 50 having a length in the longitudinal direction $d_L$ longer than the length of the leaf spring 40 in the longitudinal direction $d_L$ can encompass the distal side of the coil 60 including the first connection part 41 in its lumen, and also can encompass the parts of the leaf spring 40 and the wire 30 at a side distal to the first connection part 41 in the longitudinal direction $d_L$ in its lumen, which prevents the coil 60 from deforming and enables protection of the leaf spring 40 and the wire 30.

Preferably, as shown in FIG. 9, the cover tube 50 extends to the second connection part 42 where the distal end part of the leaf spring 40 is fixed to the shaft 2, and the cover tube 50 covers the wire 30 and the leaf spring 40 so that the wire 30 and the leaf spring 40 are not exposed in the lumen of the shaft 2. The cover tube 50 covering all the length of the wire 30 and the leaf spring 40 can sufficiently protect the wire 30 and the leaf spring 40, which repeatedly moves in a curved motion by the bending operation in the bendable catheter distal part 2D. In addition, when the catheter 1 has a conductive wire connected to an electrode or other device disposed at the distal end part of the catheter distal part 2D, the conductive wire is placed inside the shaft 2 and outside the cover tube 50. On the other hand, the wire 30 and the leaf spring 40 are disposed in the lumen of the cover tube 50 and the wire 30 and the leaf spring 40 are not exposed outside the cover tube 50 and inside the shaft 2, and therefore, interference of the leaf spring 40 and the wire 30 with the conductive wire can be prevented. The embodiments in which the cover tube 50 extends to the second connection part 42 includes an embodiment where the cover tube 50 extends to the proximal end of the second connection part 42 and an embodiment where the cover tube 50 extends to the vicinity of the proximal end of the second connection part 42.

The present application claims priority based on Japanese Patent Application No. 2020-117631 filed on Jul. 8, 2020. All the contents described in Japanese Patent Application No. 2020-117631 filed on Jul. 8, 2020 are incorporated herein by reference.

DESCRIPTION OF REFERENCE SIGNS

1: catheter
2: shaft
2D: catheter distal part
7: handle
20: tip part
30: wire
40: leaf spring
41: first connection part
42: second connection part
50: cover tube
60: coil
61: fixed part of the coil and the shaft
70: wire manipulator
d1: length from the distal end of the fixed part to the proximal end of the cover tube
d2: length from the distal end of the fixed part to the distal end of the coil
$d_L$: longitudinal direction
$d_R$: radial direction
S: length of one winding of the coil

The invention claimed is:

1. A catheter, comprising:
a shaft having a distal end, a proximal end, and a lumen extending in a longitudinal direction;
at least one wire having a distal end and a proximal end, the proximal end being disposed at a proximal end part of the shaft, and a distal end part of the wire being fixed to a distal end part of the shaft;
a coil having a distal end, a proximal end, and a lumen in which the wire is disposed and extending in the longitudinal direction in the lumen of the shaft;
a leaf spring having a distal end and a proximal end and extending in the longitudinal direction in the lumen of the shaft;
a cover tube having a distal end, a proximal end, and a lumen extending in the longitudinal direction in the lumen of the shaft, and
a fixed part where the coil is fixed to the shaft at a position proximal to the proximal end of the cover tube, wherein
the leaf spring has a first connection part where a proximal end part of the leaf spring is fixed to a distal end part of the coil, and a second connection part where a distal end part of the leaf spring is fixed to a distal end part of the shaft;
the wire, the leaf spring, and a distal part of the coil including the first connection part are disposed in the lumen of the cover tube;
the proximal end of the cover tube is positioned distal to the proximal end of the coil;
a distal end of the fixed part and the proximal end of the cover tube are separated; and
a length from the distal end of the fixed part to the proximal end of the cover tube in the longitudinal direction is a length of 20 windings of the coil or shorter.

2. The catheter according to claim 1, wherein a part of an inner surface of the cover tube is in contact with the outside of the coil.

3. The catheter according to claim 1, wherein a length from the distal end of the fixed part to the distal end of the coil is ⅓ a length of the leaf spring or longer in the longitudinal direction.

4. The catheter according to claim 1, wherein a length from the distal end of the fixed part to the distal end of the coil is 2 times a length of the leaf spring or shorter in the longitudinal direction.

5. The catheter according to claim 1, wherein the cover tube is not fixed to the shaft.

6. The catheter according to claim 1, wherein a longitudinal length of the cover tube is longer than a longitudinal length of the leaf spring.

7. The catheter according to claim 1, wherein the cover tube extends to the second connection part, and the cover tube covers the wire and the leaf spring so that the wire and the leaf spring are not exposed in the lumen of the shaft.

* * * * *